US012043495B2

(12) United States Patent
Gusmini

(10) Patent No.: US 12,043,495 B2
(45) Date of Patent: Jul. 23, 2024

(54) EXTRACTION DEVICE OF GLASS CONTAINERS FOR PHARMACEUTICAL AND/OR COSMETIC USE AND EXTRACTION PINCER

(71) Applicant: Euromatic S.r.l., Treviglio (IT)

(72) Inventor: Giorgio Gusmini, Calvenzano (IT)

(*) Notice: Subject to any disclaimer, the term of this patent is extended or adjusted under 35 U.S.C. 154(b) by 51 days.

(21) Appl. No.: 18/001,364

(22) PCT Filed: Jun. 14, 2021

(86) PCT No.: PCT/IB2021/055211
§ 371 (c)(1),
(2) Date: Dec. 9, 2022

(87) PCT Pub. No.: WO2021/260485
PCT Pub. Date: Dec. 30, 2021

(65) Prior Publication Data
US 2023/0339691 A1    Oct. 26, 2023

(30) Foreign Application Priority Data
Jun. 25, 2020 (IT) .......................... 202020000015310

(51) Int. Cl.
*B65G 29/02* (2006.01)
*B65G 47/32* (2006.01)
(Continued)

(52) U.S. Cl.
CPC ............. *B65G 29/02* (2013.01); *B65G 47/32* (2013.01); *B65G 47/847* (2013.01); *B65G 47/907* (2013.01); *B65G 2201/0258* (2013.01)

(58) Field of Classification Search
None
See application file for complete search history.

(56) References Cited

U.S. PATENT DOCUMENTS 3,614,958 A * 10/1971 Perrier ...................... B67C 7/00
198/377.07
5,598,859 A *  2/1997 Kronseder ............. B08B 9/426
134/152
(Continued)

FOREIGN PATENT DOCUMENTS

DE       102009006423     7/2010
EP          0615933       9/1994
(Continued)

*Primary Examiner* — Kavel Singh
(74) *Attorney, Agent, or Firm* — Themis Law

(57) ABSTRACT

A device for extracting glass containers for pharmaceutical and/or cosmetic use from trays that have recesses or impressions housing glass containers or the like arranged consecutively includes a wheel sector or star segment, which is caused to rotate around a horizontal axis in a circular path and which is brought above a tray moved forward at the same peripheral speed as the wheel sector or star segment. An outer peripheral surface of the wheel sector or star segment is formed as an arc of circumference and carries extraction pincers of the single glass container arranged between each other at a first reciprocal distance equal to that between the recesses or impressions of the tray, each of said extraction pincers having a pair of yielding arms that house a single glass container.

7 Claims, 14 Drawing Sheets

(51) Int. Cl.
   *B65G 47/86*    (2006.01)
   *B65G 47/90*    (2006.01)

(56) References Cited

U.S. PATENT DOCUMENTS

| | | | | |
|---|---|---|---|---|
| 7,543,697 | B2* | 6/2009 | Legallais | B65G 47/847 |
| | | | | 198/470.1 |
| 7,926,664 | B2* | 4/2011 | De Vlaam | B65B 35/58 |
| | | | | 209/617 |
| 7,937,907 | B2* | 5/2011 | Fleckenstein | B65B 3/003 |
| | | | | 53/287 |
| 8,020,690 | B2* | 9/2011 | Asma | A23G 3/125 |
| | | | | 198/470.1 |
| 8,601,777 | B2* | 12/2013 | Monti | B65B 43/42 |
| | | | | 53/266.1 |
| 8,769,913 | B2* | 7/2014 | Monti | B65B 23/22 |
| | | | | 53/251 |
| 10,946,996 | B2* | 3/2021 | Baumeister | A23G 3/563 |
| 11,155,423 | B2* | 10/2021 | Fahldieck | B65G 47/847 |

FOREIGN PATENT DOCUMENTS

| | | |
|---|---|---|
| EP | 1357063 | 10/2003 |
| EP | 2441711 | 4/2012 |
| EP | 2716593 | 4/2014 |
| EP | 3187424 | 7/2017 |
| WO | 2006077050 | 7/2006 |
| WO | 2007121930 | 11/2007 |

* cited by examiner

60° withdrawal

EXTRACTION DEVICE OF GLASS CONTAINERS FOR PHARMACEUTICAL AND/OR COSMETIC USE AND EXTRACTION PINCER

The present invention relates to an extraction device of glass containers for pharmaceutical and/or cosmetic use from trays and an extraction pincer.

In the field of the handling of glass containers for pharmaceutical and/or cosmetic use, such as syringes, cartridges and the like, specific arrangements of parts and/or machines are used which determine the required handling.

It should also be taken into account, for example, that the term syringes actually indicates syringe bodies, comprising the final flanged part and the cylindrical body containing the treatment liquid with its tip on which the needle is generally inserted.

The transporting and storage of the glass containers defined above such as glass syringes is effected with the aid of trays made of thermoplastic material (plastic tray), equipped with negative impressions of the body (diameter) of the syringes according to the their diameter.

These trays are widely used for both the shipment of syringes from the glass-tube transformer to the customer (pharmaceutical industry which subsequently provides for the washing, sterilization, assembly and filling) and also within the manufacturer's production site for transferring the syringes from one processing step to the next.

The trays are therefore used in machines where the transfer of syringes or similar objects may be required from a machine area that transports them according to a certain frequency or a certain step arrangement, for example on trays, towards a machine area that transports them in a spaced and continuous manner consecutively, such as a conveyor.

Solutions are known for example in which the syringes are extracted from a tray in which they are contained and arranged in different ways. It has been noted that the limitation of these solutions is that they damage or rub the syringe on the container itself or the extraction method ruins the thermoplastic tray.

Some solutions, in fact, intervene on the syringes through a plastic "hook" that "detaches" them from the container or tray and the syringes, rubbing against the plastic, are consequently damaged. In particular, the syringes are stained by the plastic itself.

In other solutions, a robot or a gripping device is used which withdraws the syringes from the container or tray. In this case, in order to prevent the syringes from rubbing against the plastic of the container (tray), the slots or grips of the container are "opened" with special "scissors". By doing so, the syringe containers are damaged. Furthermore, the device for opening/closing the slots requires numerous maintenance interventions, which are extremely expensive as they are high precision.

As part of the various and different handling processes, the syringes are loaded into the trays and subsequently extracted to be conveyed to an automatic unit positioned downstream. There are machines or groups, for example, in which the syringes are extracted from the above-mentioned trays and conveyed to a subsequent washing machine, etc.

A technical problem that creates difficulties in these machines or groups arises when the syringes, which are arranged in the trays at a predetermined distance based on the negative impressions of the syringes, must be transferred to a conveyor or similar equipment in which the distance between the syringes is different. Another problem that arises is that of having the feeding of the trays according to a first spatial direction and providing for the subsequent movement of the syringes withdrawn according to a different spatial direction. What is described above is not easy to overcome with the machines currently available.

EP 2441711 relates to a method for extracting glass containers according to the preamble of claim 1.

WO 2007/121930 relates to a device for packaging articles which uses gripping elements on a rotating head.

The general objective of the present invention is to provide a sector for extracting glass containers for pharmaceutical and/or cosmetic use from trays and an extraction pincer capable of solving the above-mentioned drawbacks of the prior art in an extremely simple way, economical and particularly functional manner.

A further objective of the present invention is to provide a device for extracting glass containers for pharmaceutical and/or cosmetic use from trays and an extraction pincer which avoids any possible indentation or scratching in general of the syringe being handled.

Another objective of the present invention is to provide a device for extracting glass containers for pharmaceutical and/or cosmetic use from trays and an extraction pincer which guarantees continuity in the extraction of the containers from trays.

The above objectives are achieved by a device for extracting glass containers for pharmaceutical and/or cosmetic use from trays and an extraction pincer produced according to independent claim 1 and the following subordinate claims.

The structural and functional characteristics of the present invention and its advantages with respect to the known art will become even more evident from the following description, referring to the attached schematic drawings, which show an embodiment example of the invention. In the drawings.

Figure 1:
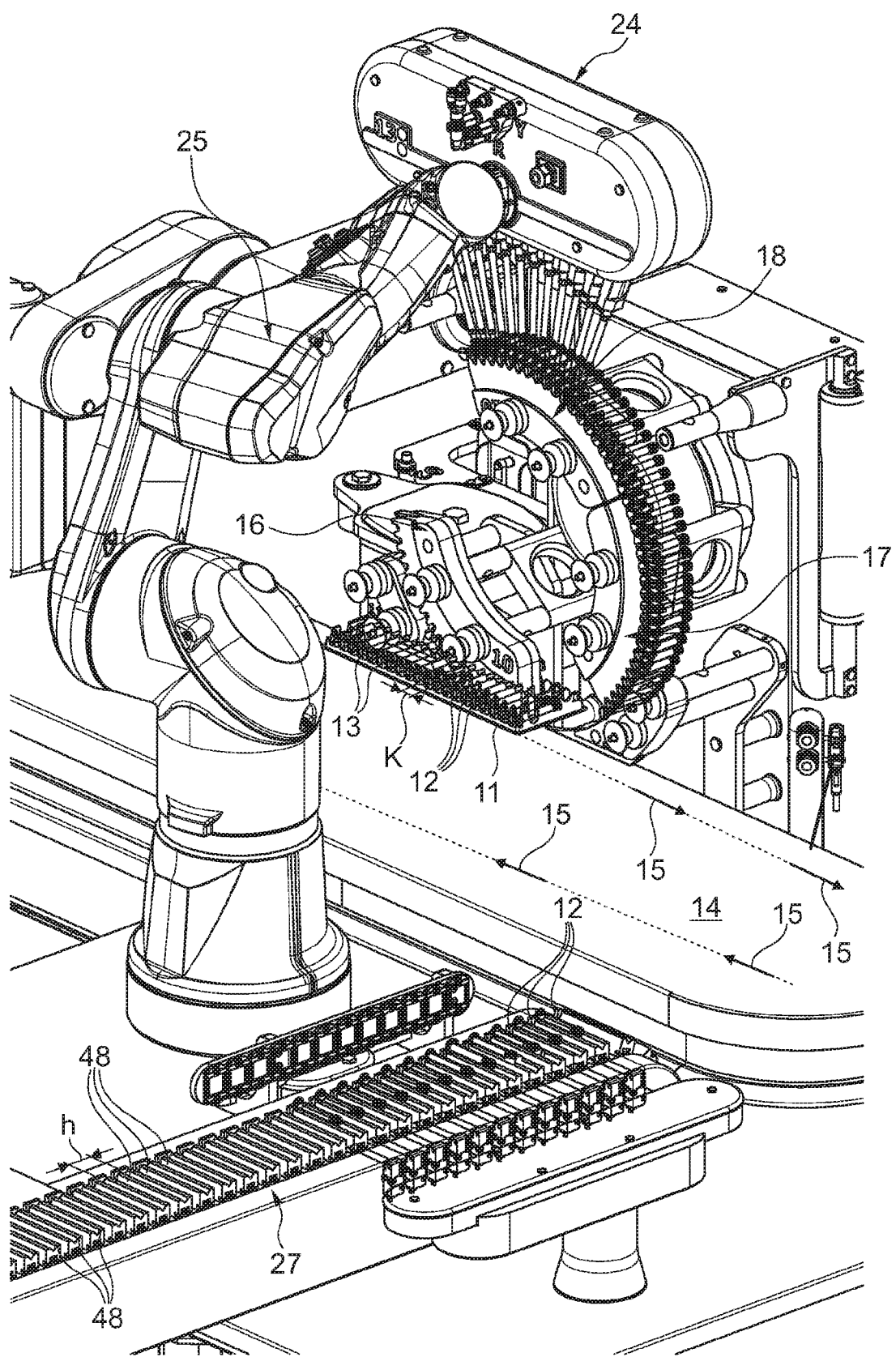
FIG. 1 shows an overall perspective view of a part of a syringe treatment machine in which a handling system is provided for extracting syringes from a tray and transferring them to a continuous conveyor according to the present invention, positioned and operating in a first operating position of the system with the robot head for withdrawal.
Figure 2:
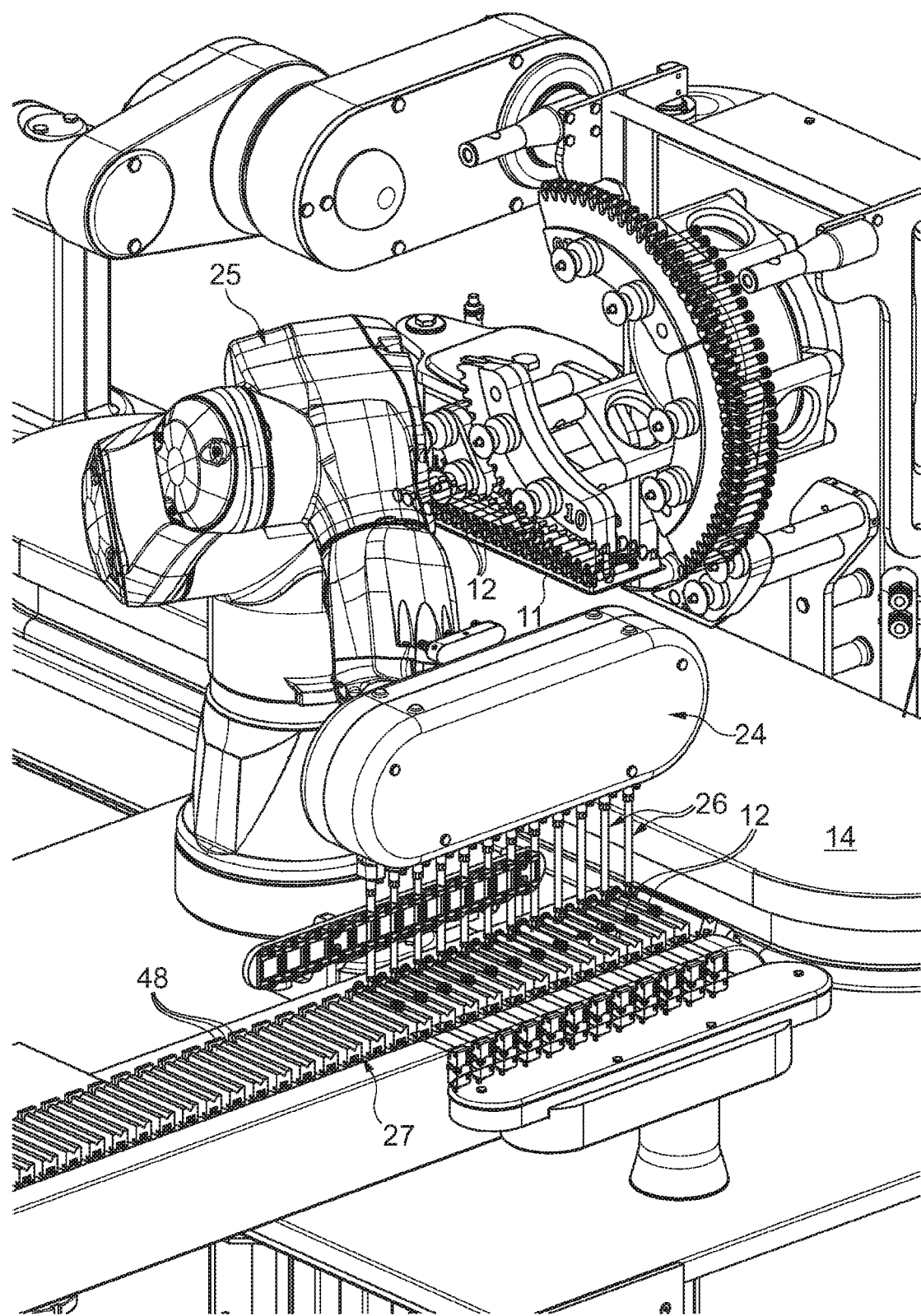
FIG. 2 is a perspective view, similar to that of FIG. 1, in a second operating position with the robot head releasing the syringes onto a linear conveyor.
Figure 3:
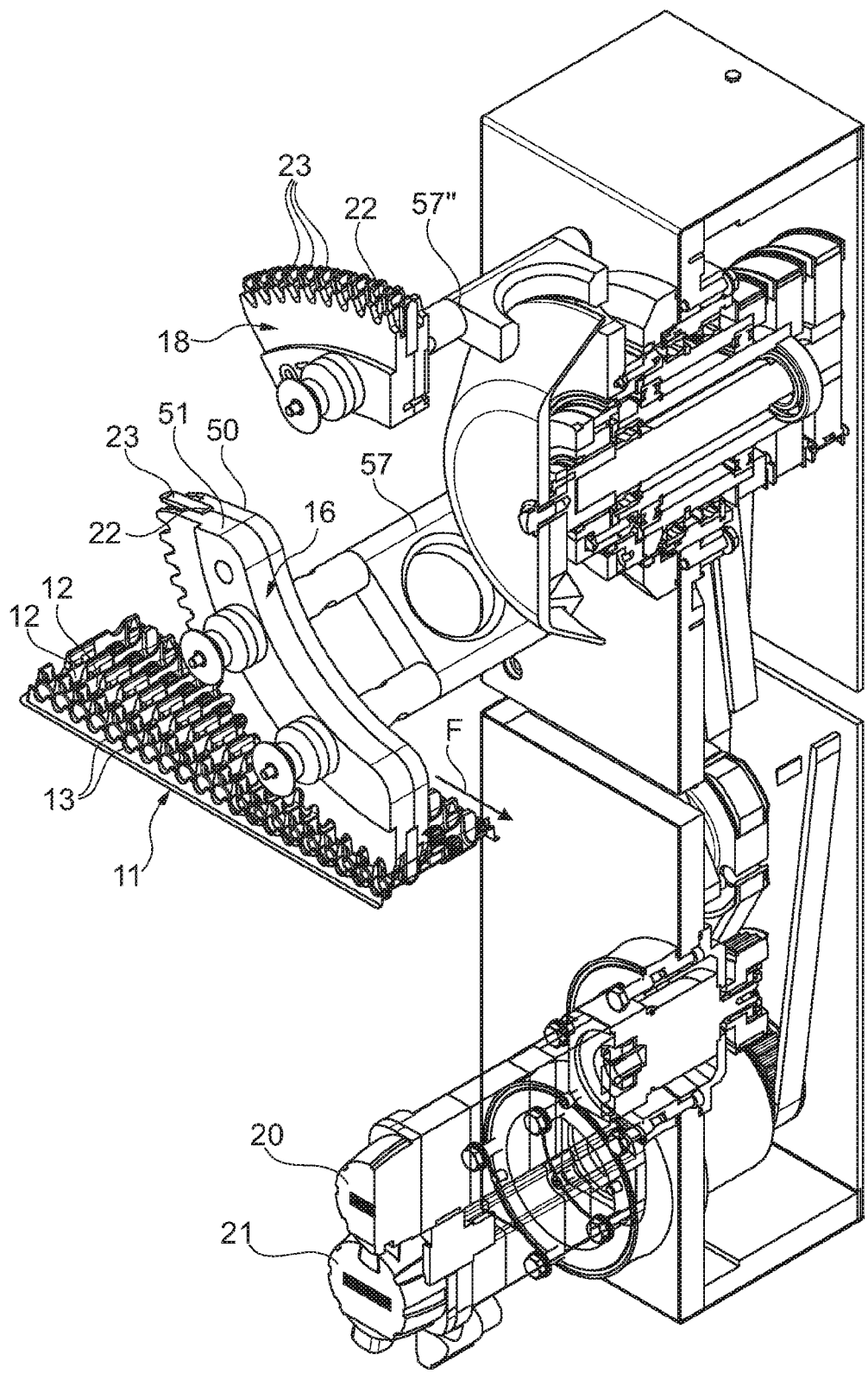
FIGS. 3 and 4 show a partial perspective view and a sectional view of the system which allows the rotation according to a circumference of wheel or star sectors of a device for extracting syringes from underlying trays.
Figure 4:
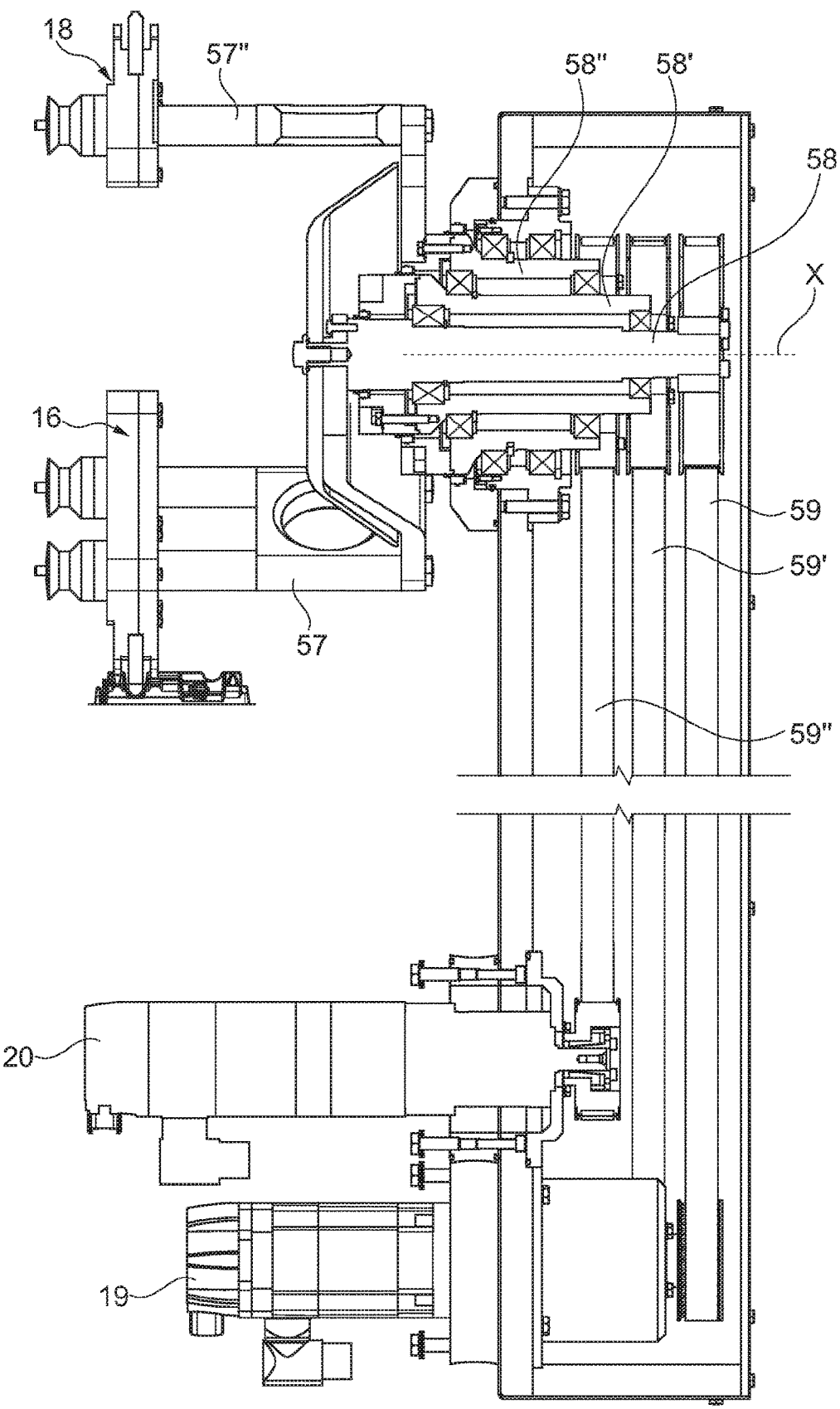
Figure 5:
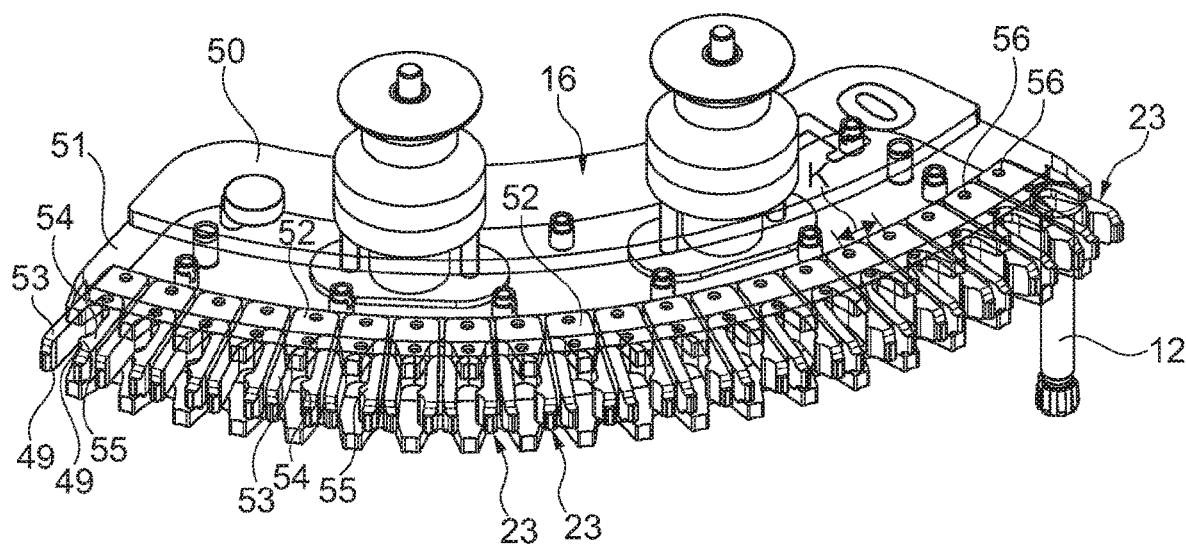
FIGS. 5 and 6 show perspective views of one of the wheel or star sectors equipped with extraction pincers.
Figure 6:
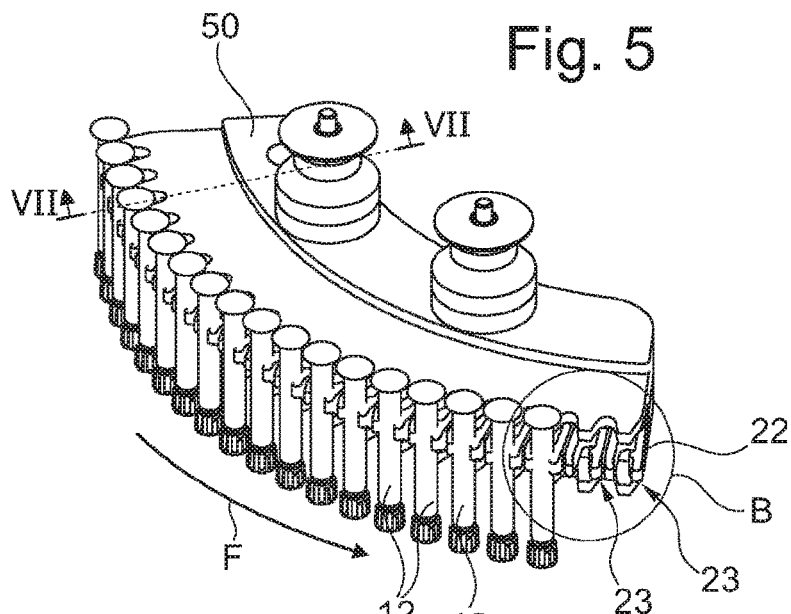
Figure 7:
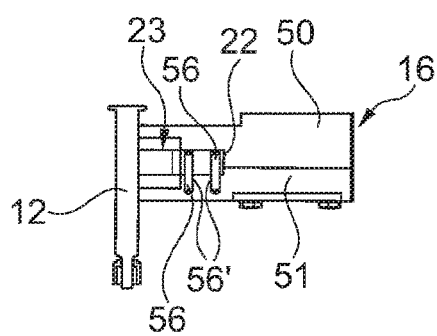
FIGS. 7 and 8 show a section taken along the line VII-VII of FIG. 6 and an enlarged detail according to the circle B indicated in FIG. 6 of parts of the wheel or star sector.
Figure 8:
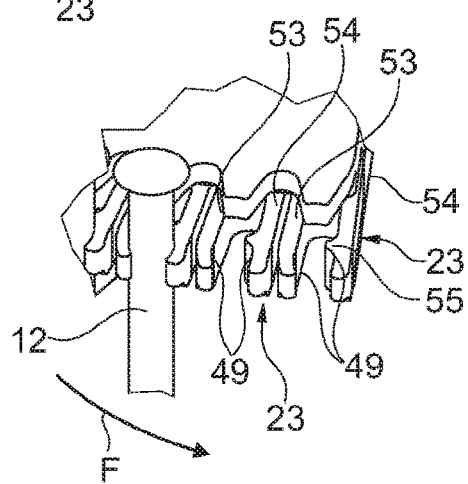
Figure 10:
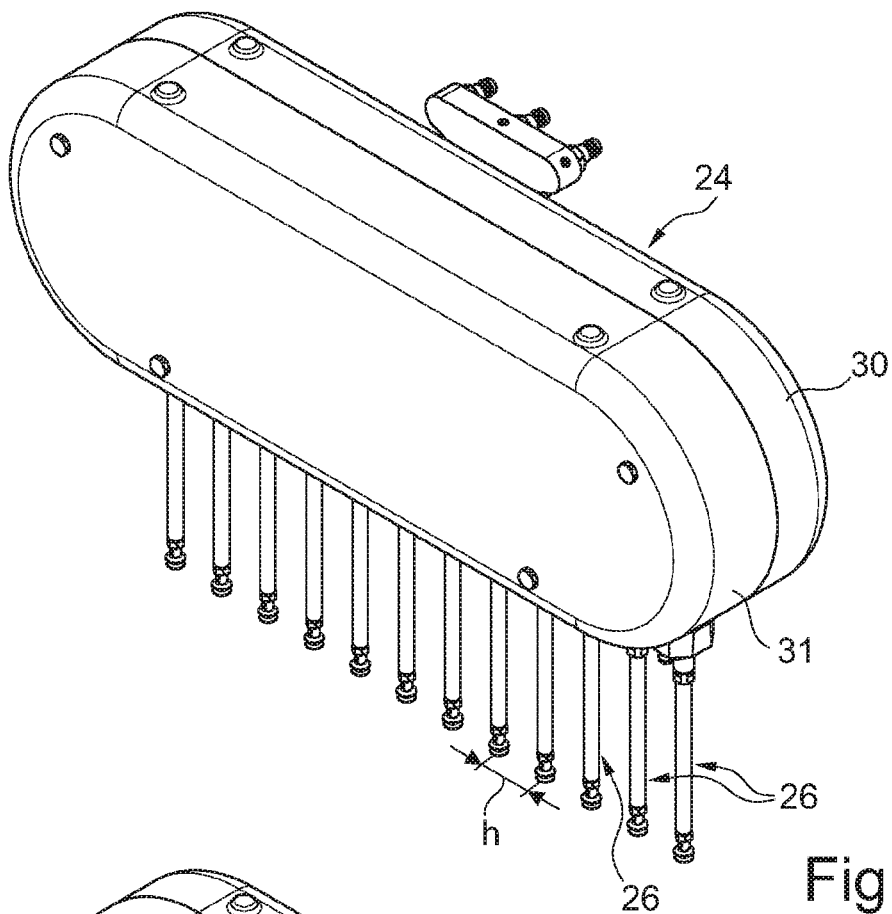
FIGS. 9 and 10 show perspective views of a robot head, as illustrated, with gripping elements as positioned in FIGS. 1 and 2, respectively.
Figure 9:
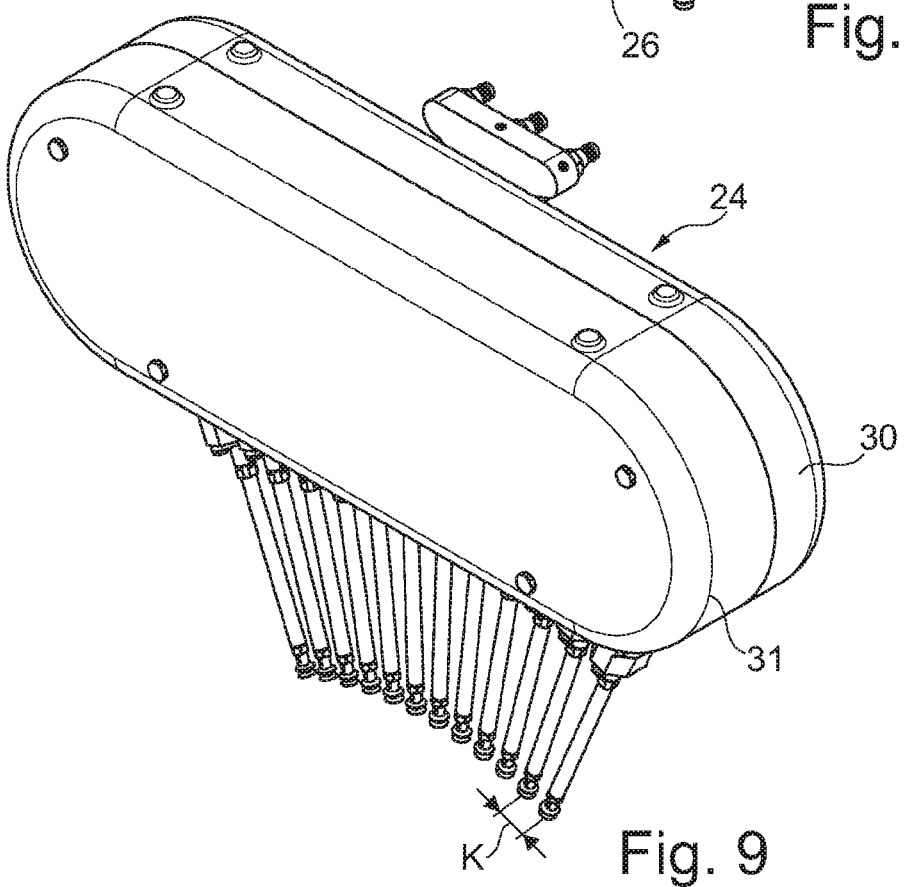
Figure 11:
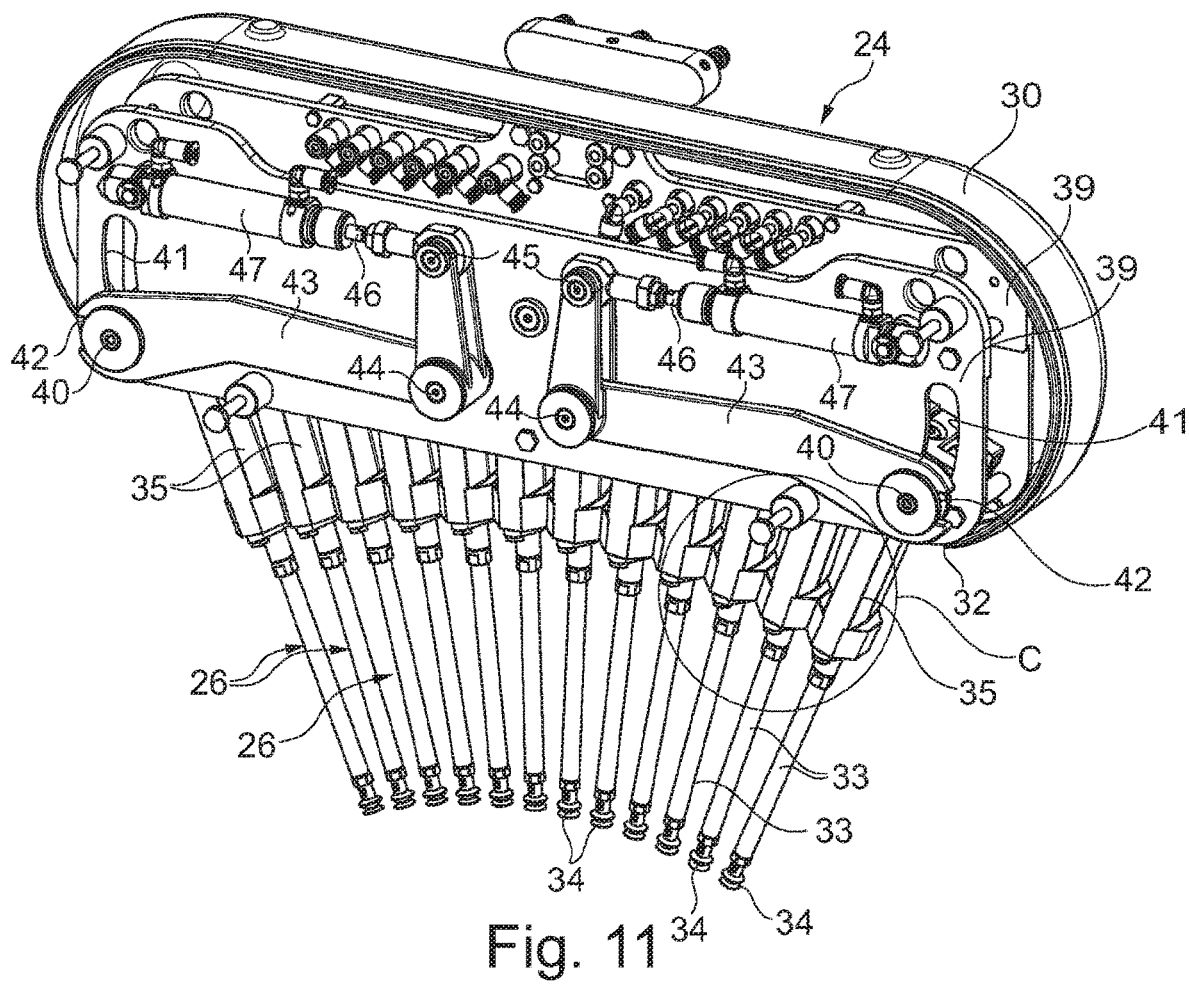
Figure 11B:
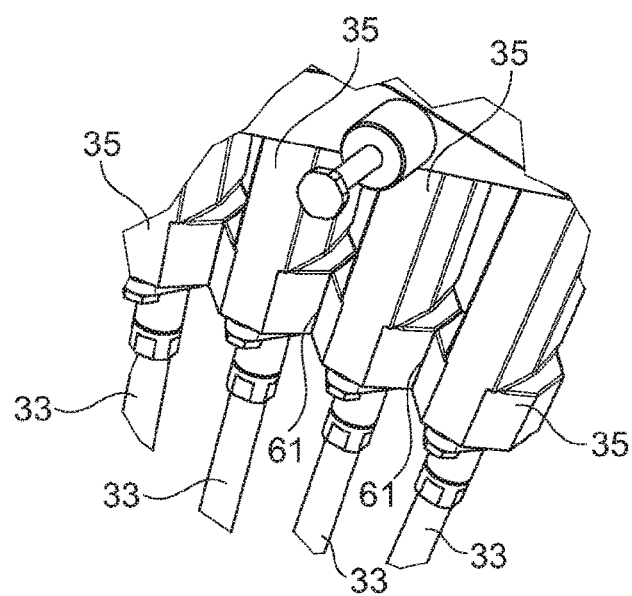
Figure 12:
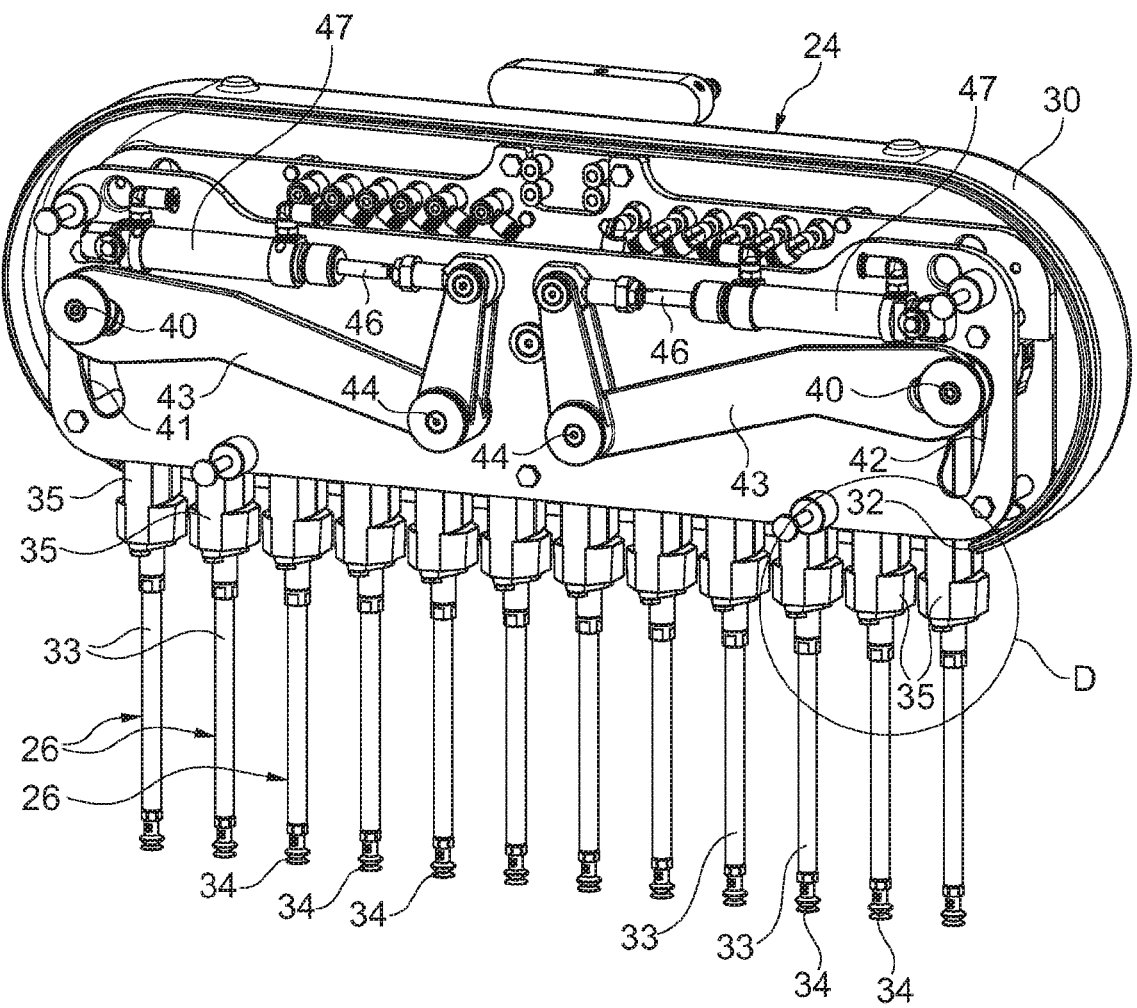
Figure 12B:
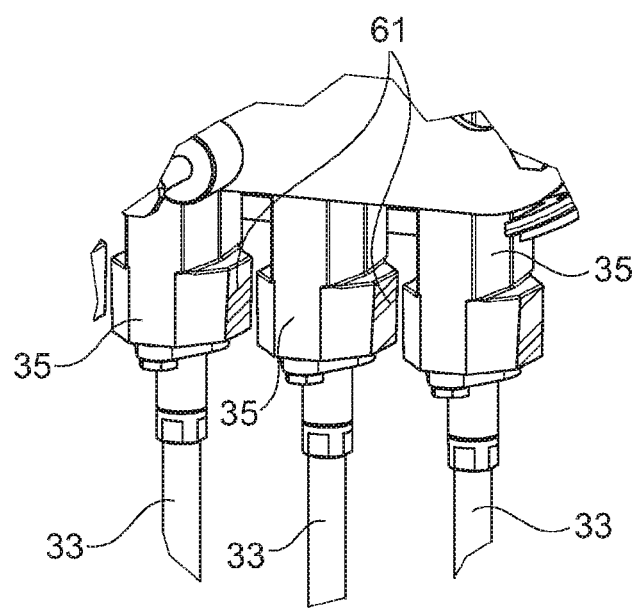
Figure 13:
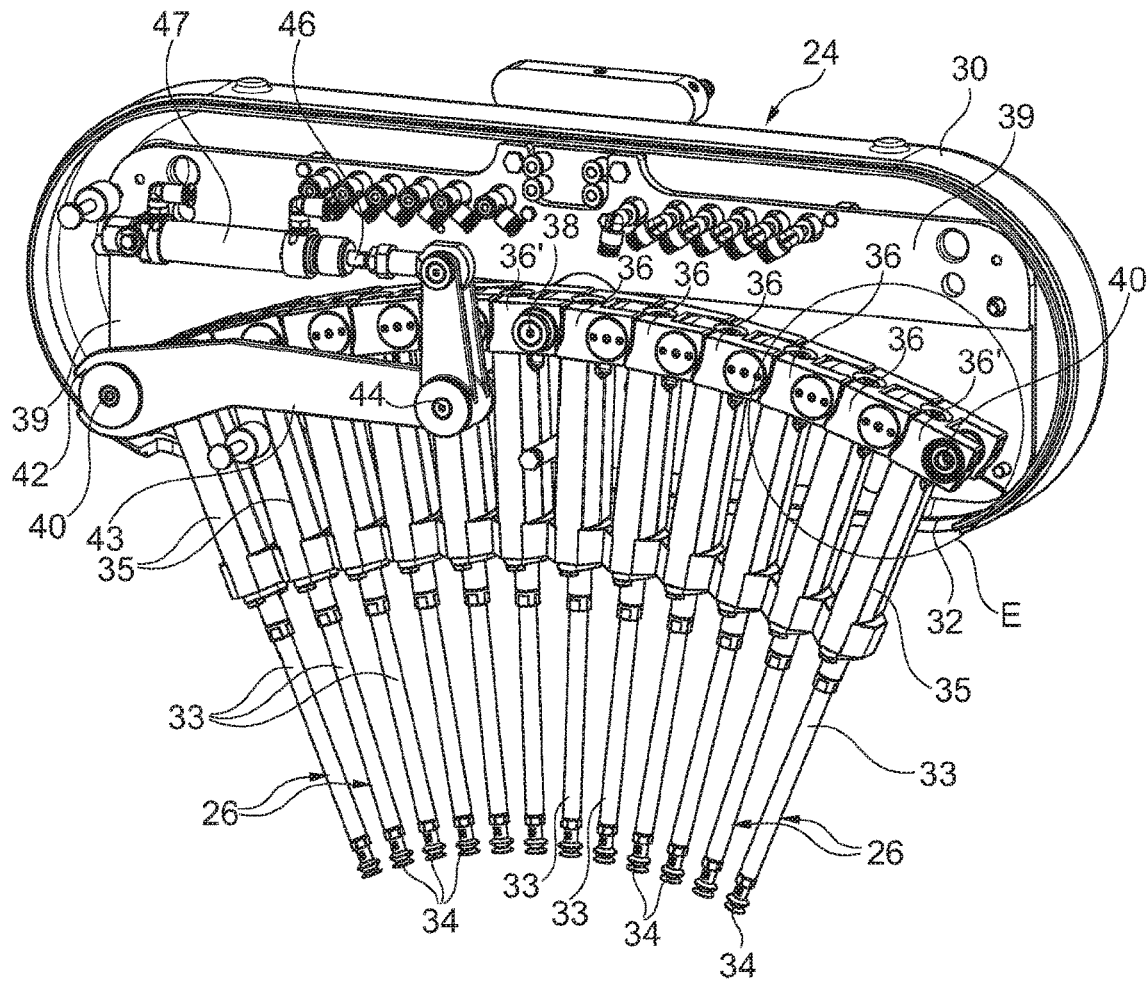
Figure 13B:
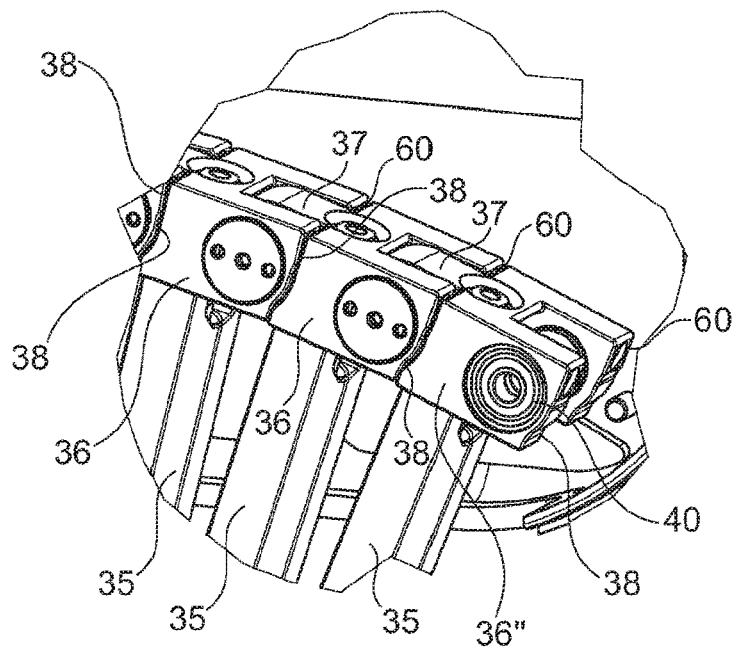
Figure 14:
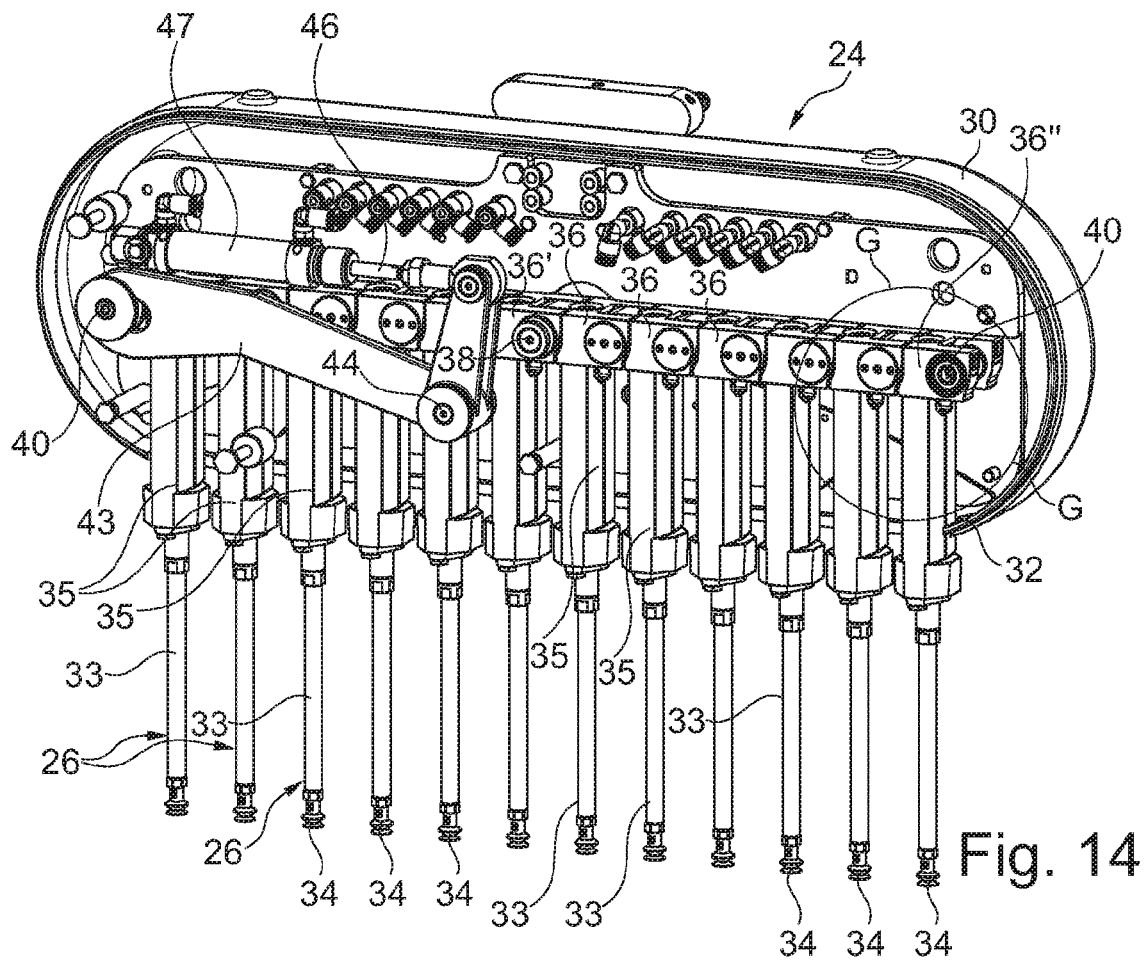
Figure 14B:
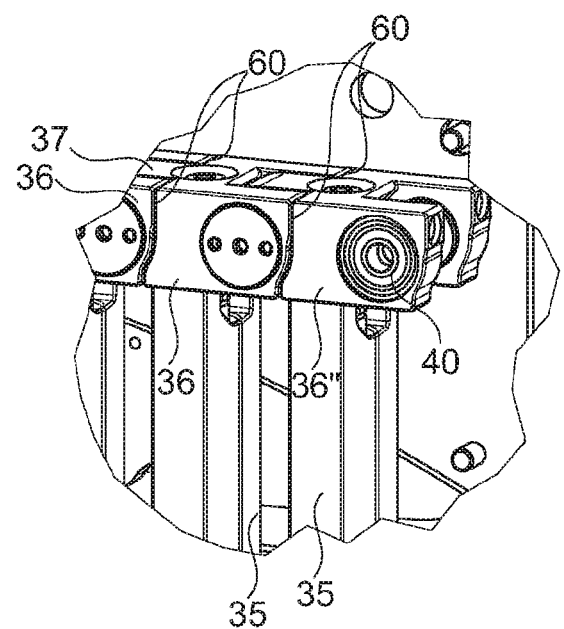
Figure 15:
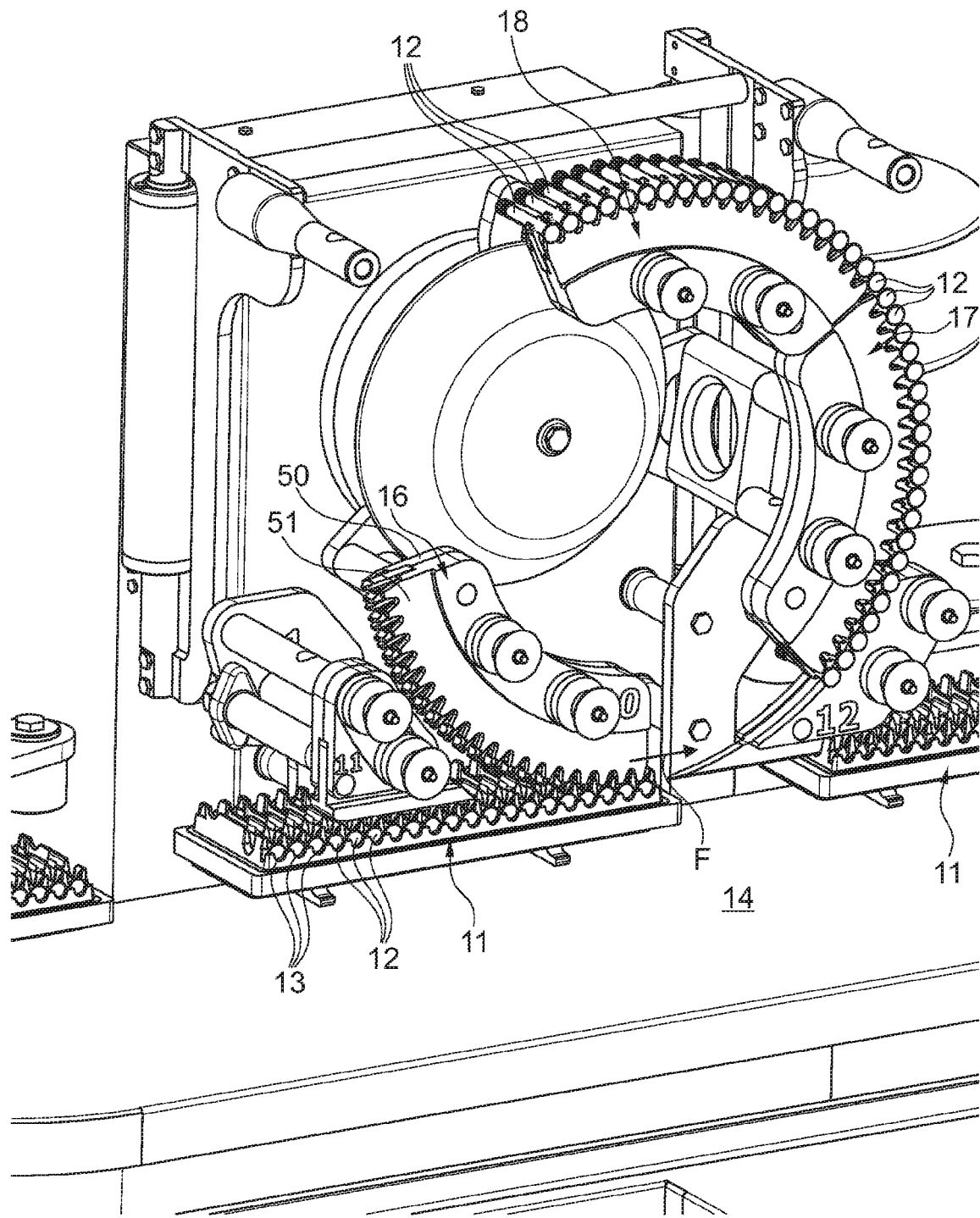
Figure 16:
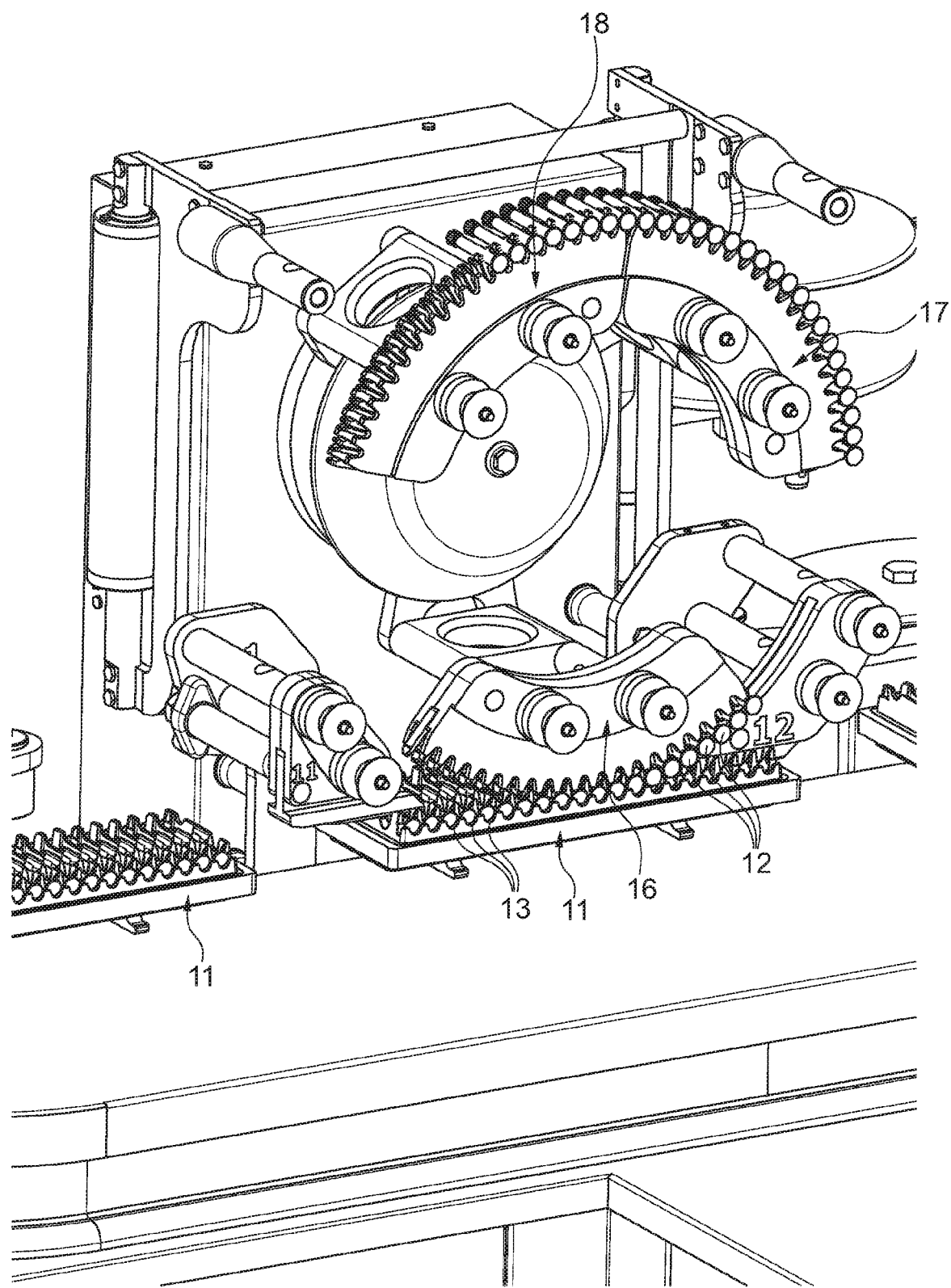
Figure 17:
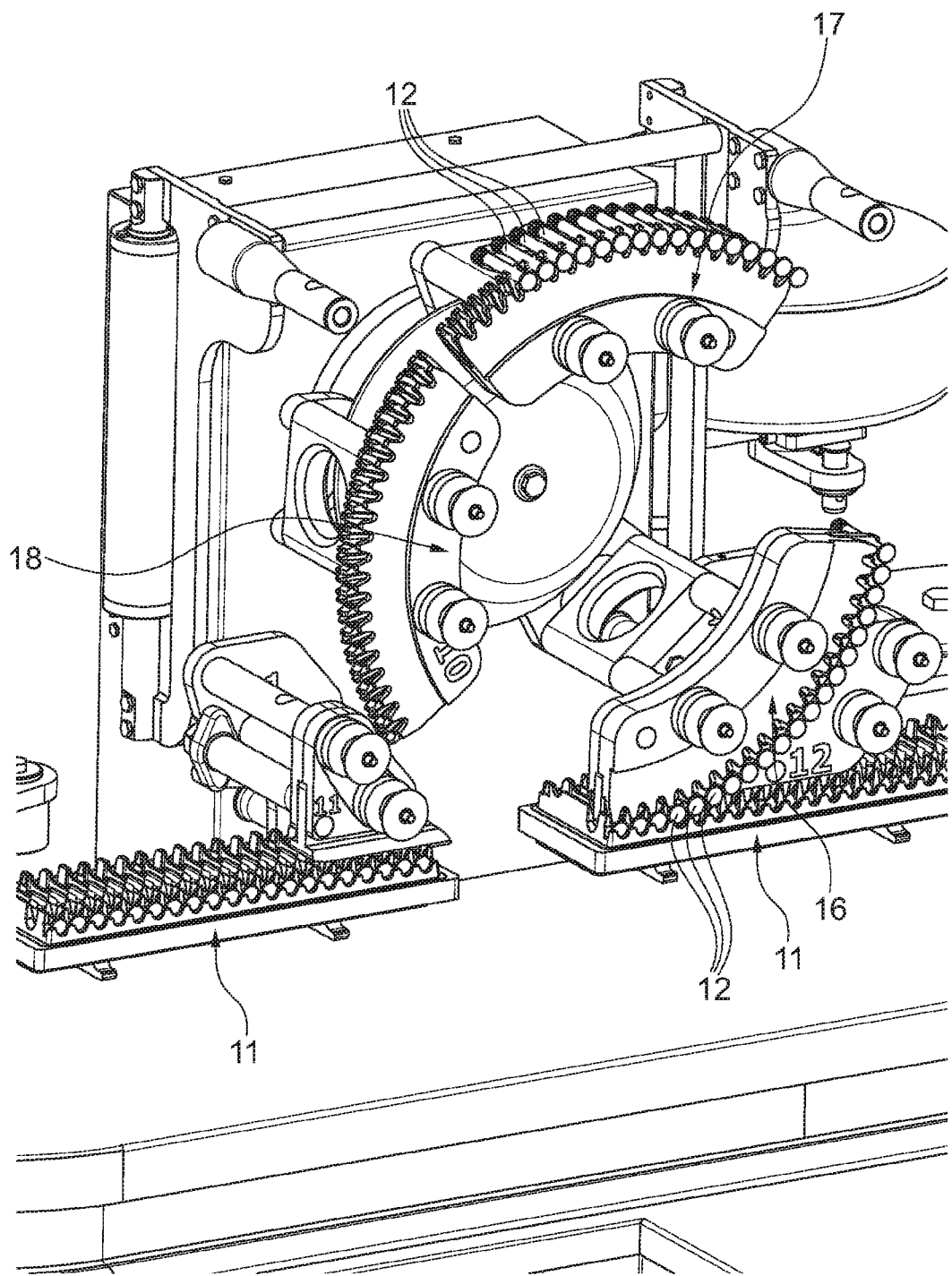

FIGS. 11 and 11*b* show split sectional perspective views and through an enlarged detail according to the circle C of the robot head as shown in FIGS. 1 and 9 in the withdrawal position;

FIGS. 12 and 12*b* show split sectional perspective views and through an enlarged detail according to the circle D of the robot head as shown in FIGS. 2 and 10 in the release position;

FIGS. 13 and 13*b* show perspective views similar to those of FIGS. 11 and 11*b* according to different sections and details according to the circle E in the withdrawal position;

FIGS. 14 and 14b show perspective views similar to those of FIGS. 12 and 12b according to different sections and details according to the circle G in the release position;

FIGS. 15, 16 and 17 show, in three different positions, the movement sequence of the three wheel sectors or star segment during the extraction of the syringes;

the schematic figures from 18 to 23 show a series of positions suitable for understanding how a single sector moves in its circular path around the axis X.

With reference to the exemplary and non-limiting figures, these show an embodiment of a device for extracting glass containers for pharmaceutical and/or cosmetic use, such as syringes, from trays and a respective extraction pincer from a tray.

Indications such as "vertical" and "horizontal", "upper" and "lower" (in the absence of other indications) should be read with reference to the assembly (or operating) conditions and referring to the normal terminology used in current language, where "vertical" indicates a direction substantially parallel to that of the force of gravity vector "g" and a horizontal direction perpendicular to it.

Referring first to FIGS. 1 and 2, a syringe handling system provides a feeding of trays 11, for example of the type generally used in these machines, each containing a row of syringes 12 or the like, housed in suitable recesses or impressions 13 of the same trays 11. The trays 11 are caused to move and advance at a predetermined distance from each other on a horizontal feeding plane 14 according to a loop path indicated by the track 15, in steps and/or continuously depending on the specific operating phase.

The trays 11 are thus brought and passed under an extraction device of the syringes 12 from the trays 11. The extraction device comprises three wheel sectors 16, 17 and 18, or star segments, caused to rotate around a common horizontal axis X along a circular path through respective motors 19, 20 and 21. The wheel sectors 16, 17 and 18 on an outer peripheral surface formed as an arc of circumference, inserted in a suitable arched groove 22, carry a series of extraction pincers 23 of the single syringe 12 arranged at a first reciprocal distance k corresponding to the pitch between consecutive recesses or impressions 13 of the trays 11.

As clearly shown in the figures, the single wheel sector 16, 17 and 18, rotating around the axis X, moves on a vertical plane, perpendicular to the feeding plane of the trays, and follows a trajectory, indicated by the arrow F, which is in a tangent direction to the feeding plane 14, and to the trays 11, according to a circular pattern. The three wheel sectors 16, 17 and 18 therefore occupy less than three quarters of the circumference they are moving along and can thus follow each other in the above-mentioned trajectory as will be seen hereunder.

Their movement is such as to allow the extraction of the single syringe 12 from the single tray 11 moving on the lower horizontal feeding plane 14 (FIG. 1). Furthermore, it is such as to guarantee their movement towards an upper position, in particular a gripping position of a head 24 of a manipulator or withdrawal robot 25. All of this takes place thanks to the synchronism between the wheel sectors 16, 17 and 18 for the extraction of the syringes 12 and the movement of the tray 11 which is part of the flow of the trays on the horizontal plane.

The head 24 of the withdrawal robot 25 provides a series of gripping elements 26 that are movable and variable in position with respect to each other according to the choice of the pitch or distance between consecutive gripping syringes 12.

The robot 25, in the movement of its head 24 in space towards a continuous linear conveyor 27 below (FIG. 2), is capable of varying the pitch or distance between consecutive gripped syringes 12 for preparing them to be arranged in housings 48 provided in said linear conveyor 27.

It should be noted that these housings 48 of the linear conveyor 27, for example a belt, are arranged at a second distance h different from the first distance k so that the syringes are released at a reciprocal distance different from the distance they had when they were carried by the wheel sectors or star segments 16, 17 and 18 i.e. from the trays 11. And this second distance h turns out to be specifically the correct distance for deposition on the linear conveyor 27.

In this way, the head 24 of the robot 25 effects a linear deposit on the conveyor 27 with a different deposition pitch as required and according to the type of conveyor 27 in use.

An important detail of the present invention, which solves the problems of the known art, is that of obtaining a variation in pitch between the individual syringes through this movement from the trays to the linear conveyor. The system or the robot head in fact allows the syringes to be taken at one pitch and deposited on a subsequent conveyor or machine station at a different pitch.

Specifically, the syringes 12 are extracted from the single tray 11 arranged at a first distance k between one syringe and another (FIG. 1). This extraction takes place through the wheel or star sectors 16, 17 and 18 with a series of extraction pincers 23 which extract the single syringe 12 with an identical pitch. The wheel or star sectors 16, 17 and 18 then cause the syringes 12 to be withdrawn from the head 24 of the robot 25.

Through this transfer, therefore, the required spacing between the individual syringes 12 takes place and also a variation in their positioning on the planes or in the desired parts of the machine, useful for their correct treatment. By means of the present invention, in fact, the syringes fed on the trays according to a first spatial direction are moved so as to acquire a different spatial direction.

FIGS. 3 to 8 show some aspects of the extraction device, the composition of the single wheel or star sector 16, 17 and 18 and the rotation movement of these sectors according to a circumference.

The extraction device, as already mentioned, comprises three wheel sectors 16, 17 and 18, or star segments, caused to rotate around a common horizontal axis X by means of respective motors 19, 20 and 21. The wheel sectors 16, 17 and 18 on an outer peripheral surface, inserted in a suitable arched groove 22, carry a series of pincers 23 for extracting the single syringe 12.

As clearly shown in the figures, the single wheel sector 16, 17 and 18, rotating around the axis X, moves on a vertical plane and follows a circular trajectory, indicated by the arrow F (FIG. 3), which proves to be in a direction tangent to the feeding plane 14 and, therefore, to the trays 11. The three wheel sectors 16, 17 and 18 occupy less than three quarters of the circumference they are moving along and can thus follow each other in the above-mentioned trajectory.

Each single wheel sector 16, 17 and 18 or star segment comprises a body in two halves 50, 51 on whose peripheral surface having a larger diameter facing outwardly, facing recesses are formed in each of said two halves 50, 51, which define the previously mentioned arched groove 22.

The series of extraction pincers 23 of the single syringe 12 (FIGS. 5 to 8), as already mentioned, arranged at a first distance k from each other, is inserted in this groove 22.

These pincers or jaws 23 are made of plastic material and have a body 52 constrained to one of said sectors and from which two side arms 53, 54 extend, yielding to form an elongated U. The first arm 53, slightly curved in a recess or curved portion 49 towards the free end for housing the syringe 12, has a substantially constant thickness. The second arm 54 is provided with an intermediate tooth 55 protruding inwardly and facing the other arm 53. This tooth 55 forms a supporting surface for the syringe 12 which it houses in a curved portion 49 mirroring that 49 provided on the first arm 53.

The single extraction pincer 23 is in fact brought from the sector 16 (as shown in FIGS. 1 and 15) or 17 or 18 to become tangentially engaged on the syringes 12 according to the arrow F and allows the syringe 12 to be accommodated inside the two arms 53, 54.

More specifically, the syringe 12 is arranged within the curved portions 49 of the arms 53 and 54, with the arm 54 advancing first with respect to the arm 53. This causes the syringe 12, when it becomes engaged between the arms 53, 54, to become abutted against the notch 55 of the arm 54. This positioning causes the syringe 12 to be extracted from the impression 13 of the tray 11 without any effort, gently, without any rubbing or friction.

The sector in extracting action brings one pincer after another to extract a respective syringe 12 without any effort.

Holes 56' are provided in the body 52, which receive fastening pins 56 to the respective sector within one of the two halves 50, 51 of the body of the wheel sector 16, 17 and 18 or star segment.

Each wheel sector 16, 17 and 18 or star segment is caused to rotate around the axis X as it is carried by a respective arm 57, 57', 57" connected to a respective section of shaft 58, 58', 58". These sections of shaft 58, 58', 58" are arranged coaxially with respect to each other and are driven by motors 19, 20 and 21 through transmission belts 59, 59', 59". The motors 19, 20 and 21 are determined in particular movements in the electronic cam so that the wheel sectors 16, 17 and 18 or star segment follow each other with speed variations and stoppages independently of each other, so as to ensure a continuous and constant supply of sectors full of syringes beneath the head 24 of the withdrawal robot 25.

With respect to FIGS. 9 to 14b, these show the robot head and its functionality in an exemplary and non-limiting embodiment, in greater detail.

The head 24 of the withdrawal robot 25 provides a series of gripping elements 26 which are movable and variable in position with respect to each other according to the choice of the pitch or distance between consecutive syringes 12, both in the gripping position and in the deposition or release.

The head 24 comprises an external box in two coupled parts 30, 31 which is arranged vertically with a lower elongated opening 32 formed halfway on each of the two parts 30, 31. The gripping elements 26 protrude from said opening 32 and are in the form of a series of rods 33 provided at their free ends, with gripping elements (FIGS. 11-14). In the example shown, each gripping element consists of a sucker 34, but a pincer or other similar gripping element could be identically provided.

The head contains a movement and position-variation mechanism of the gripping elements 26, with respect to each other, which is described hereunder in its exemplary but non-limiting embodiment.

The rods 33 are arranged at their other end, and each rod extends from first free ends of tubular bodies 35. At second ends, the tubular bodies are integral with links 36, arranged in the form of a chain articulated consecutively by means of intermediate biscuits 37 hinged to the same (FIGS. 13-14b). The single links 36 have shaped side surfaces 38 collaborating with each other so that subsequent links 36 can move on a plane while remaining in contact with each other.

It should also be noted that there are twelve links 36 in the example carrying twelve tubular bodies 35, twelve rods 33 with respective suckers 34, but they could be in another preselected number.

One link 36', intermediate between the other links 36, is free to rotate around pins 38 (FIG. 13), which are hinged on plates 39. These plates 39 are arranged integrally inside the two coupled parts 30, 31 of the box.

Final end links 36" of the series of links 36 also carry pins 40 (FIGS. 11 and 13) that are engaged in arched slots 41 formed at opposite ends of the plates 39. These pins 40 are in turn connected and arranged free to rotate in end openings 42, the latter formed at a first end of square rods 43. Said square rods 43 are in turn centrally hinged in a pin 44 integral with the plates 39 around which they oscillate. Opposite ends of these square rods 43 are connected by means of pins 45 to ends of stems 46 of actuation cylinders 47 articulatedly connected at their free end to the plates 39. The actuation of the cylinders 47 causes an oscillation of the square rods 43 with a variation in the position of the series of links 36 and therefore of the gripping elements 26. Thanks to the presence of the arched slots 41, in fact, the links 36 acquire two different extreme operating positions. In a position close to each other (FIGS. 13 and 13b) the links 36 are arranged in an arc and with gripping elements 26 which are arranged almost converging towards a central point. Supporting surfaces 60 obtained in consecutive links 36 in the upper part of the same are detached in this position. Furthermore, facing supporting surfaces 61 are provided on the tubular bodies 35, which are arranged in contact with each other to favour the convergent position of the gripping elements 26.

In a second position, aligned along a straight line (FIGS. 14 and 14b), the links 36 are shifted so that the gripping elements 26 are all parallel to each other and spaced apart. The above-mentioned supporting surfaces 60 in this position are caused to be arranged in support and favour the aligned and parallel position of the gripping elements 26.

The first position, with rods close together and converging at one point, corresponds to the withdrawal position of the syringes 12 from the wheel sectors 16, 17 and 18, or star segments, when brought into the withdrawal position with syringes arranged according to the above-mentioned first distance k. The second position, on the other hand, with parallel rods, corresponds to the release position of the syringes 12 on the linear conveyor 27 carried by the head 24 of the robot 25.

In this second position, a second distance h is obtained between successive syringes, different from the first distance k they had when they were carried by said wheel sectors or star segments or by the trays 11, the second distance h being exactly the correct distance for deposition in the linear conveyor 27.

In this way, it can be seen how the robot 25 in moving its head 24 in space towards an underlying linear conveyor 27 is capable of varying the pitch or distance between successive gripped syringes 12 by suitably activating the cylinders 47 between the two above-mentioned positions. In this way, the head 24 of the robot 25, on the one hand, effects a correct withdrawal from the sectors 16, 17 or 18 thanks to the correct position also determined by the supporting surfaces 61 of the tubular bodies 35 and, on the other hand, a linear deposition on the conveyor 27 with the deposition pitch always correct determined by the supporting surfaces 60 of the links 36.

If syringes 12 having different diameters, taken from sectors with different pincers 23 in trays with impressions having a different pitch, are to be treated and deposited correctly on the linear conveyor, the rods 33 of the gripping elements 26 must be replaced with rods having a variable length.

Thanks to the particular head 24 of the robot 25 described above, the user can even intervene by defining a preselected and defined number of syringes.

This can be particularly useful and advantageous if the format of the syringe varies, and the type of tray and its number of internal impressions are also correspondingly variable.

This is effected using a particular algorithm that allows the speed/positioning of the star sectors to be varied so that they can "move", distributing the syringes step by step and continuously (without holes). All of this takes place even if the number of syringes inside the tray has changed according to the size of the syringe/composition of the tray.

This is also thanks to the fact that the robot head is capable of taking the syringes at a certain pitch (distance between one syringe and the other) from the star sector and releasing these syringes to a subsequent process station at a different pitch (distance between one syringe and the other).

The three FIGS. 15, 16 and 17 show the movement sequence of a wheel sector 16, 17 and 18 or star segment when it acts on a tray which is moved and advanced at a predetermined distance from a previous tray and from a subsequent tray on the horizontal feeding plane 14.

The first FIG. 15 shows how the sector, for example 16, carries the series of extraction pincers 23 in correspondence with the initial part of the tray 11 carrying a predetermined number of syringes 12.

The first of these extraction pincers 23 becomes engaged on the first syringe 12, present in a first recess or impression 13 of the tray 11, and removes it, carrying it with it. The same operation is effected by the subsequent pincers 23 which act on the subsequent syringes 12, arranged in the subsequent impressions 13 which are provided in the tray 11.

The second FIG. 16 shows how the sector 16, continuing in its rotation, already has the respective syringes 12 in a certain number of extraction pincers 23 and how the tray 11 is simultaneously moved forward in synchronism on the horizontal feeding plane 14.

Finally, the third FIG. 17 shows how the sector 16 has withdrawn several syringes 12 and the tray 11, which is moving forward in perfect synchronism, has most of the impressions 13 empty. The sector 16 has therefore almost completed the extraction of the syringes 12 from the tray 11.

The wheel sector or star segment 16 in this example, thanks to the particular design and conception of the extraction pincers 23 present in it, gently extracts the single syringe 12 from the tray 11, avoiding any possible friction or staining between the parts in question.

The present invention, in fact, allows the wheel sector or star segment 16 to "engage with" the syringes 12 tangentially and one by one in succession, by means of a gentle extraction and without "forcing" the extraction of the single syringe 12. This is thanks to the arrangement of the parts and to the fact that the single pincer or jaw 23 is produced with the two side arms 53, 54 yielding. More specifically, an arm 53 in its curved portion 49 accommodates the syringe 12 which is also accommodated in the facing curved portion 49 of the other arm 54. This second arm 54 is provided with an intermediate notch 55 protruding inwardly which collaborates for receiving the syringe 12 with ease and without any effort.

This arrangement of parts ensures a perfect and constant synchronism of the wheel sector 16, 17 or 18 for the extraction of the syringes 12 with the continuous movement of the tray 11 in perfect synchronism at the same advancement rate.

Each wheel sector or star segment, 16, 17 or 18 is in fact caused to rotate around the common horizontal axis X according to a circular path and when it is brought above a tray from which the containers or syringes are to be extracted, each tray is moved forward at the same peripheral speed as the sector acting in extraction.

The three figures mentioned above also show how their movement is effected in this rotary motion around the axis X when extracting syringes or similar containers 12.

The wheel sectors 16, 17 and 18 or star segment are in fact determined in particular movements in the electronic cam so that they follow each other in such a way as to ensure a continuous and constant supply of sectors full of syringes 12 to the above head 24 of the withdrawal robot 25, which in this way has a constant and continuous supply of syringes 12.

In practice, the sectors 16, 17 and 18 have accelerations and decelerations which are such that the single sector, for example the sector 16 in FIG. 15, when brought above the single tray 11, is controlled at the same peripheral speed and follows it until the tray 11 is completely emptied due to the various positions acquired between the parts, some of which are shown in FIGS. 15 to 17.

At the end of the extraction of the syringes 12 (FIG. 17), the sector then accelerates and moves to the end of the previous sector which had already been filled with syringes (see for example the sector 17 which goes to the end of the sector 18 in FIG. 15).

The single sector, for example the sector 18 in FIG. 1, which on the other hand must face the head 24 of the robot 25 to allow the withdrawal of the syringes, moves to the withdrawal position and stops them to specifically allow the withdrawal of the syringes 12.

The sector, for example the sector 18 in FIG. 17, once emptied, is then rapidly prepared for facing a new tray 11 full of syringes, which just as rapidly becomes synchronized with the sector 18 on arrival. All of this is then moved forward at the same speed when the extraction of the syringes 12 from the tray is initiated by the sector equipped with extraction pincers 23 of the single syringe 12.

This alternation between accelerations, advancing at a constant speed, accelerations, stoppages, etc. is indicated as an "electronic cam" controlled exclusively by a program and by the speed variations of the motors 19, 20 and 21 which synthesize a certain law of motion.

The schematic figures from 18 to 23 show how a sector moves in its circular path around the axis X.

Figure 18:
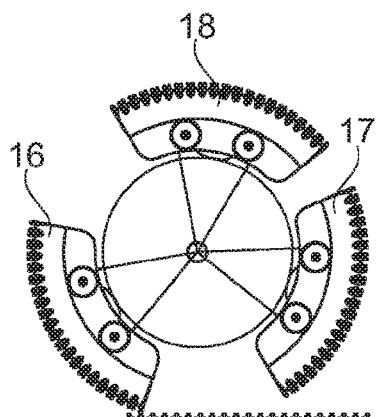
Figure 19:
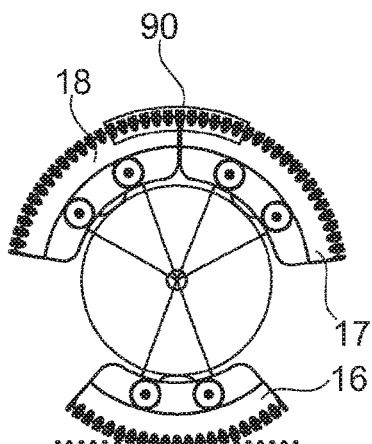
Figure 20:
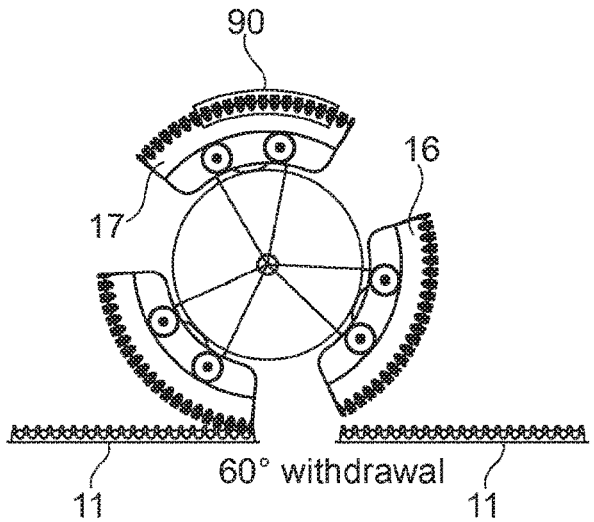

FIGS. 18, 19, 20 repeat the movement of the single sector in its extraction phase, i.e. when, with the peripheral speed equal to that of the advancement of the tray 11, it extracts the syringes from the tray itself. The sector shown for example is sector 16.

Figure 21:
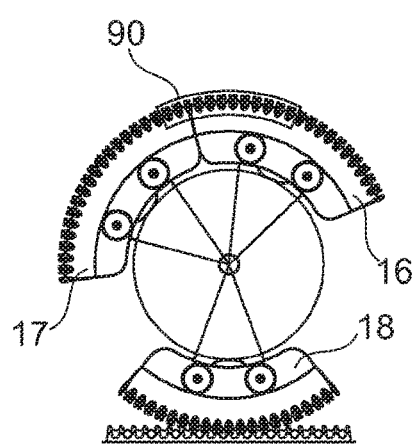

At the end of this extraction phase, the sector 16 rapidly accelerates to the position of FIG. 21 immediately behind the preceding sector 17. In this position both the sector 17 and the sector 16 stop. In this stop position of the sectors 16, 17 a predetermined number of syringes is withdrawn, partly from the sector 17 together with some initial syringes carried by the sector 16 thus moved. This withdrawal is indicated with 90 in FIG. 19 from the sectors 16 and 17, and also with 90 in FIG. 20 from the sector 17 and with 90 in FIG. 21 from the sectors 16 and 17.

Figure 22:
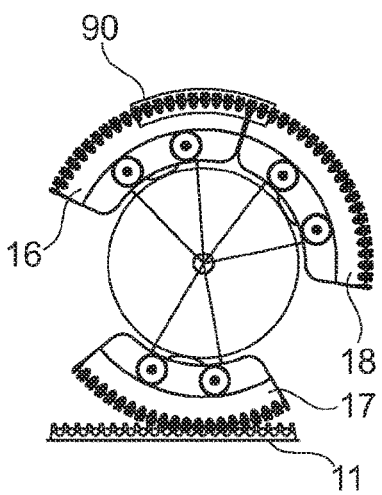

FIG. 22 shows a subsequent position in which the emptied sector 17 has rapidly moved until it is over a new tray to extract new syringes. The sector 16, on the other hand, which has advanced in rotation for a certain length, stops and together with the sector 18, presents itself for extraction. All of this naturally occurs in sectors 16, 18 stationary in the withdrawal position, wherein the withdrawal is indicated with 90 as in the previous cases.

Figure 23:
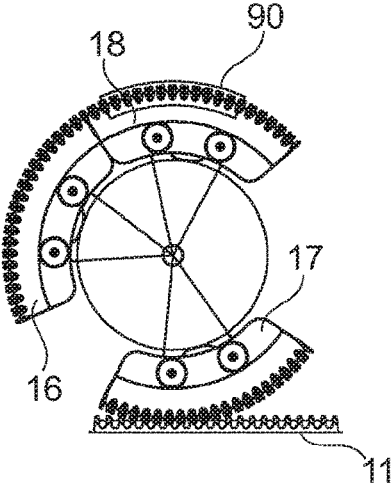

Finally, FIG. 23 shows how the sector 16, also emptied, starts its rapid rotation to move onto a subsequent tray whereas the sector 17 is continuing its extraction from the tray and the sector 18 is stationary to allow the withdrawal of the predetermined number 90 of 12 syringes mentioned above.

It should also be noted that the invention proposes a new method.

This is in fact a method for the extraction of syringes contained in a tray 11 and their transfer to a continuous conveyor 27. As can be seen, the trays 11 are provided with a series of recesses or impressions 13 which house a series of syringes 12 or the like and are caused to move forward and advance at a predetermined distance from each other on a feeding surface 14 in steps and/or continuously. In this way, the trays are brought beneath a device for extracting the syringes from the trays, wherein the extraction device comprises the wheel sectors or star segments, 16, 17 and 18, caused to rotate around a common horizontal axis X according to a circular path.

The wheel sectors or star segments 16, 17 and 18 have on an outer peripheral surface formed as an arc of circumference, a series of extraction pincers 23 of the single syringe 12 arranged between each other at a first reciprocal distance k. This distance k is equal to the distance between recesses or impressions 13 of trays 11.

Furthermore, a robot head intervenes in the method which is provided with movement in space and which provides a series of gripping elements 26 for withdrawing said syringes 12 carried by the sectors and releasing them onto the linear conveyor.

The method of the invention provides for a series of innovative steps.

A step is in fact provided for extracting said syringes one at a time from said trays by means of said pincers carried by said sectors, wherein said sectors are caused to rotate tangent to said trays which move forward in synchronism with the rotation of the sectors.

This extraction has been found to be without any friction and such as to not damage the syringes.

This step is followed by a step for withdrawing all of the syringes together carried by said pincers of a single sector by means of said withdrawal elements of said robot head, once the rotation of said single sector has been stopped.

Once the syringes have been withdrawn, this is followed by a step for transferring all of said syringes withdrawn by said robot head from said sectors to a position above said linear conveyor to arrange them in the housings 48 of the conveyor 27.

To do this, an intermediate and completely innovative step must be implemented. This step, which is effected during the transfer of said robot head, causes the syringes carried by the withdrawal elements positioned at a first distance k to be moved to a second distance h, different from the first distance k, for depositing all the syringes together on said linear conveyor 27 in the relative housings 48.

For this purpose, the gripping elements 26 are movable and variable in position with respect to each other.

Finally, there is naturally a step for releasing all of the syringes brought together at the second distance k on the continuous linear conveyor.

As seen and written, the examples refer to syringes, but the method and the system in its parts are identically suitable for glass containers as specified above.

Further variants are possible from the embodiments described above, without departing from the teaching of the present invention.

Finally, it is evident that groups and methods thus conceived can undergo numerous modifications and variations, all of which are within the scope of the invention; furthermore, all the details can be replaced by technically equivalent elements. In practice, the materials used, as also the dimensions, can vary according to the technical requirements.

The objective mentioned in the preamble of the description has thus been achieved.

The protection scope of the present invention is defined by the enclosed claims.

The invention claimed is:

1. A device configured for extracting glass containers for pharmaceutical and/or cosmetic use from trays, wherein the trays (11) are provided with a series of recesses or impressions (13) which house a series of the glass containers (12) arranged consecutively, the device comprising:

at least one wheel sector or star segment, (16,17 and 18), which is caused to rotate around a horizontal axis (X) according to a circular path and which is brought above a tray which is moved forwards at a same peripheral speed as the wheel sector or star segment, wherein said at least one wheel sector or star segment (16,17 and 18) carries, on an outer peripheral surface formed as an arc of circumference, a series of extraction pincers (23) of a single glass container (12) arranged at a first reciprocal distance (k) from one another that is equal to a distance between said recesses or impressions (13) of the tray, wherein each of said extraction pincers (23) has a pair of yielding arms (53,54) configured to house a single glass container (12), wherein said at least one wheel sector or star segment (16, 17 and 18) comprises a body having two halves (50, 51), and wherein, in a peripheral surface of the body having a larger diameter and facing outwardly, facing recesses are formed in each of said two halves (50, 51), said facing recesses defining an arched groove (22), which receives said series of extraction pincers (23).

2. The device according to claim 1, wherein said extraction pincers (23) are made of a plastic material.

3. The device according to claim 1, wherein said extraction pincers (23) have a body (52), integral with said at least one wheel sector or star segment (16,17 and 18), two side yielding arms extending (53,54) from said body of said extraction pincers and forming an elongated U.

4. The device according to claim 3, wherein both of said yielding arms (53,54) have a curved portion (49) towards a free end of said yielding arms, said free end facing an opposite arm (54,53).

5. The device according to claim 3, wherein one (54) of said two arms (53,54) is provided with an intermediate tooth (55), protruding inwardly, facing another one of said two arms (53), said intermediate tooth forming a supporting surface for the single glass container (12).

6. An extraction pincer for a single glass container from a tray to be used in a device according to claim 1, wherein said extraction pincer is made of a plastic material, and wherein said extraction pincer comprises the body (52) from which the two side yielding arms (53,54) extend, to form the elongated U, and wherein the first arm (53) has a curved portion (49) towards a free end and the second arm (54) has a curved portion (49) mirroring the curved portion of the first arm (53), the curved portion of the second arm having an intermediate notch (55), extending inwardly, and facing the first arm (53), the intermediate notch providing a supporting surface for the single glass container (12).

7. A method of extracting glass containers for pharmaceutical and/or cosmetic use from trays with a device according to claim 5, wherein the trays (11) are provided with the series of recesses or impressions (13) which house the series of glass containers (12), arranged consecutively, comprising:

causing the at least one wheel sector or star segment (16, 17 and 18) to rotate around the horizontal axis (X) along the circular path; and bringing the at least one wheel sector or star segment (16, 17 and 18) above one of said trays (11), which is moved forward at the same peripheral speed as said at least one wheel sector or star segment;

bringing each of the pincers (23) by the at least one sector (16,17 or 18) to engage on the single glass container (12) arranged in the tray according to a path tangential to the tray, wherein in the step of bringing, said at least one wheel sector or star segment is brought above said single tray, which is moved forward at the same peripheral speed as the at least one wheel sector or star segment; and advancing a second arm (54) of said two arms first with respect to a first arm (53) of said two arms, so that the single container (12), when engaging between the two arms (53,54), becomes abutted against a notch (55) of the second arm (54) and is extracted from the tray by the pincers (23)

wherein a device for extracting the glass containers from the trays is used, which comprises three wheel sectors or star segments (16,17 and 18), which are individually driven by a respective motor (19,20,21) which causes said three wheel sectors or star segments (16,17 and 18) to rotate around the horizontal axis (X) according to the circular path, and wherein said three wheel sectors or star segments, (16,17 and 18) follow each other with speed variations and independent stoppages of one sector with respect to other sectors so as to ensure a continuous and constant supply of sectors (16,17 or 18) full of the glass containers (12) below a head (24) of a robot (25) for withdrawing a predetermined number of the glass containers all at once.

\* \* \* \* \*